US012539798B2

(12) United States Patent
Li et al.

(10) Patent No.: US 12,539,798 B2
(45) Date of Patent: Feb. 3, 2026

(54) ROTATABLE ARMREST AND CONSOLE ASSEMBLY PROVIDED WITH THE SAME

(71) Applicants: Hyundai Motor Company, Seoul (KR); Kia Corporation, Seoul (KR); Seoyon E-Hwa Co., Ltd., Gyeonggi-do (KR)

(72) Inventors: Cheng Kun Li, Yantai (CN); Chun Lei Sang, Yantai (CN); Won Young Bae, Seoul (KR); Bong Ju Choi, Gyeonggi-do (KR); Jae Min Kim, Gyeonggi-do (KR)

(73) Assignees: Hyundai Motor Company, Seoul (KR); Kia Corporation, Seoul (KR); Seoyon E-Hwa Co., Ltd., Gyeonggi-do (KR)

( * ) Notice: Subject to any disclaimer, the term of this patent is extended or adjusted under 35 U.S.C. 154(b) by 491 days.

(21) Appl. No.: 17/993,269

(22) Filed: Nov. 23, 2022

(65) Prior Publication Data
US 2023/0158931 A1 May 25, 2023

(30) Foreign Application Priority Data
Nov. 23, 2021 (CN) .......................... 202111392565.5

(51) Int. Cl.
*B60N 2/75* (2018.01)
*B60R 7/04* (2006.01)

(52) U.S. Cl.
CPC ............... *B60N 2/763* (2018.02); *B60R 7/04* (2013.01)

(58) Field of Classification Search
None
See application file for complete search history.

(56) References Cited

U.S. PATENT DOCUMENTS

| | | | | |
|---|---|---|---|---|
| 1,359,953 A * | 11/1920 | Bell | ...................... | E05F 1/1075 217/60 E |
| 3,950,819 A * | 4/1976 | Little | .................... | E05F 1/1058 16/85 |
| 6,652,032 B2 * | 11/2003 | Laval | ..................... | B60N 2/753 297/411.32 |
| 6,832,412 B2 * | 12/2004 | Kim | ......................... | E05F 5/00 16/365 |
| 8,931,834 B2 * | 1/2015 | Wallace | ............. | B64D 11/0646 244/118.6 |
| 9,950,651 B2 * | 4/2018 | Delling | .................. | B60N 2/933 |

(Continued)

FOREIGN PATENT DOCUMENTS

CN 106166971 * 11/2016

*Primary Examiner* — Joseph D. Pape
(74) *Attorney, Agent, or Firm* — Fox Rothschild LLP

(57) ABSTRACT

Provided are a rotatable armrest and a console assembly provided with the rotatable armrest. The rotatable armrest includes a case, a knob system, and a hinge system, in which the knob system and the hinge system are mounted in the case. The hinge system includes a counterbalance shaft, and the rotatable armrest may be rotatable about the counterbalance shaft and fixed in a first position, a second position, and a third position. In the first position, the rotatable armrest is positioned in a folded down position, in the second position, the rotatable armrest is positioned in a horizontally forward-facing position, and in the third position, the rotatable armrest is positioned in a horizontally backward-facing position.

20 Claims, 22 Drawing Sheets

(56) References Cited

U.S. PATENT DOCUMENTS

| | | | |
|---|---|---|---|
| 10,434,950 B2* | 10/2019 | Ike | B60R 7/04 |
| 2002/0089217 A1* | 7/2002 | Scheerhorn | B60R 7/04 297/188.19 |
| 2015/0258923 A1* | 9/2015 | Skapof | B60R 7/04 296/24.34 |

* cited by examiner

ROTATABLE ARMREST AND CONSOLE ASSEMBLY PROVIDED WITH THE SAME

CROSS-REFERENCE TO RELATED APPLICATION

This application claims under 35 U.S.C. § 119(a) the benefit of Chinese Patent Application No. 202111392565.5 filed in the Chinese National Intellectual Property Administration on Nov. 23, 2021, the entire contents of which are incorporated herein by reference.

BACKGROUND

Technical Field

The present disclosure relates to a rotatable armrest, and more particularly, to a rotatable armrest for a vehicle and a console assembly provided with the rotatable armrest.

Description

In general, a console assembly of a vehicle is installed between a driver's seat and a passenger seat of the vehicle and includes a storage box for temporarily storing objects, and an armrest is installed on the storage box of the console to serve as a cover and at the same time allows a passenger sitting in a vehicle seat to rest his arm comfortably.

FIGS. 1 and 2 illustrate a console assembly including an object storage box and an armrest used as a cover of the object storage box in the related art. The armrest may rotate about 90° (i.e., an angle α in FIG. 2) to open the object storage box, and the object storage box provides a storage space.

The armrest of the console assembly in the related art does not provide a device on which rear seat passengers can place objects such as cups or phones. In addition, when the armrest is closed, the console assembly has to support the armrest, so there is a problem that the console assembly takes up a lot of space.

Accordingly, the conventional console assembly and its armrest need to be further improved.

The above information disclosed in this Background section is only for enhancement of understanding of the background of the disclosure, and therefore it may contain information that does not form the preexisting technology that is already known in this country to a person of ordinary skill in the art.

SUMMARY

The present disclosure has been made in an effort to provide a rotatable armrest and a console assembly provided with the rotatable armrest having advantages of allowing the armrest to rotate to save a space for placing an object of the console assembly.

In addition, the present disclosure has been made in an effort to provide a rotatable armrest and a console assembly provided with the rotatable armrest having advantages of not only providing convenience for a front seat passenger to place an object, but also providing convenience for a rear seat passenger to place an object.

In one aspect, an exemplary embodiment of the present disclosure provides a rotatable armrest.

In one aspect, a rotatable armrest is provided, comprising: a) a case; b) a knob system; and c) a hinge system, wherein the knob system and the hinge system are mounted in the case, and wherein the hinge system comprises a counterbalance shaft, and wherein the rotatable armrest is rotatable about the counterbalance shaft and fixed in a first position, a second position, and a third position. Preferably, the first second and third positions are distinct positions (i.e. the first position, second position and third positions are different positions). In one embodiment, in the first position, the rotatable armrest is positioned in a folded down position. In an embodiment, in the second position, suitably the rotatable armrest is positioned in a horizontally forward-facing position. In an embodiment, in the third position, suitably the rotatable armrest is positioned in a horizontally backward-facing position.

In a further aspect, the rotatable armrest includes a case, a knob system, and a hinge system, in which the knob system and the hinge system are mounted in the case. The hinge system includes a counterbalance shaft, and the rotatable armrest may be rotatable about the counterbalance shaft and fixed in a first position, a second position, and a third position. In the first position, the rotatable armrest is positioned in a folded down position, in the second position, the rotatable armrest is positioned in a horizontally forward-facing position, and in the third position, the rotatable armrest is positioned in a horizontally backward-facing position.

The case includes an armrest upper cover, an armrest lower cover, a left garnish and a right garnish that are coupled to each other. When the armrest upper cover, the armrest lower cover, the left garnish, and the right garnish are combined, an opening is formed in a front portion of the case.

The knob system includes a knob, and the knob is positioned within the opening.

The knob system further includes a knob housing, a knob shaft, a first torsion spring, a knob rear shaft, and a knob bracket. A rear end of the knob is connected to the knob rear shaft, a middle portion of the knob is mounted on the knob housing through the knob shaft, the knob is rotatable about the knob shaft, the knob shaft is fitted with a first torsion spring, one end of the first torsion spring is connected to the knob bracket, and the first torsion spring applies a restoring force for returning the knob shaft to the knob shaft. The knob housing is mounted on a knob bracket.

The counterbalance shaft is provided with at least one lower bracket, and the lower bracket includes a disc part and a lower bracket body. A concave groove is installed at a front end of an arc of the disc part, front and rear ends of the lower bracket body are each provided with first and second latching grooves, and both ends of the arc of the disc part extend to the first latching groove and the second locking groove, respectively.

The hinge system further includes a hinge bracket, a locking assembly, and a brake assembly. The number of lock assemblies and brake assemblies corresponds to the number of lower brackets. The locking assembly and the brake assembly are mounted on the hinge bracket.

The hinge bracket includes a hinge bracket body and a mounting plate positioned at a rear end of the hinge bracket body.

The locking assembly includes a wire, a locking connection member, and a locking member. The wire is mounted on a middle portion of the hinge bracket body of the hinge bracket, one end of the wire is connected to the knob rear shaft, the locking connection member and the locking member are each rotatably mounted on the mounting plate of the hinge bracket through the first and second shafts, a first end of the locking connection member is connected to the other end of the wire, and a second end of the locking connection member is connected to a connection part of the locking member.

Second and third torsion springs are provided on the first and second shafts, respectively, and the second and third torsion springs provide the restoring force for returning the locking connection member and the locking member to the locking connection member and the locking member, respectively.

The locking assembly further includes a housing, and the housing covers the locking connection member and the locking member.

The brake assembly includes a shaft bracket, a friction plate, and a hinge shaft. The shaft bracket is mounted on an outside of the lower bracket through the hinge shaft, and the friction plate is mounted between the shaft bracket and the mounting plate of the hinge bracket through the hinge shaft.

Another exemplary embodiment of the present disclosure provides a console assembly. The console assembly includes a console, the rotatable armrest according to the exemplary embodiment of the present disclosure, and a connection device for mounting the rotatable armrest on the console.

The connection device includes a hinge mounting bolt, and the armrest assembly is mounted on the console through the hinge mounting bolt.

According to the exemplary embodiment of the present disclosure, the rotatable armrest may be positioned at different positions by rotating about a counterbalance shaft. Accordingly, the rotatable armrest may be used by a person in the front seat as well as by a person in the rear seat. In addition, it is possible to save a space in the console assembly with the rotatable armrest folded down.

A method and apparatus according to an exemplary embodiment of the present disclosure may have other characteristics and advantages, which will become apparent in the accompanying drawings and subsequent exemplary embodiments, or will be described in detail in the accompanying drawings and subsequent exemplary embodiments in the text, and these drawings and exemplary embodiments are used to interpret certain principles of the disclosure.

In another embodiment, vehicles may be provided that comprise an apparatus as disclosed herein.

Figure 1:
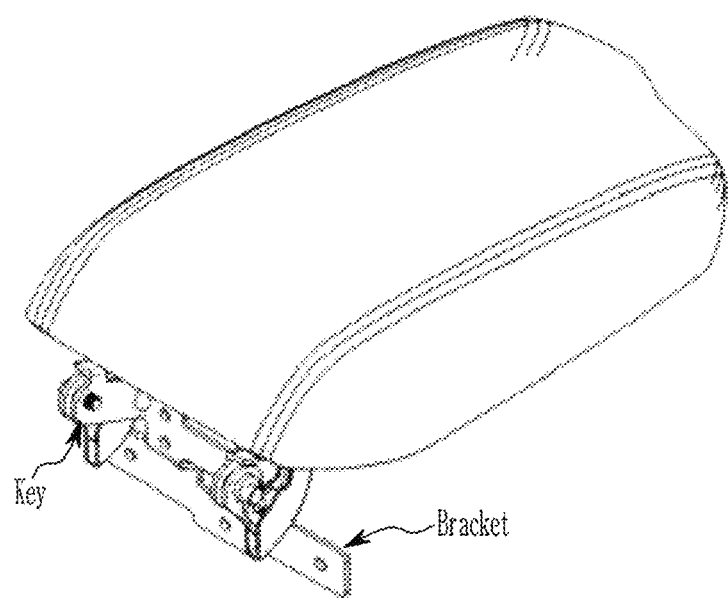
FIG. 1 is a schematic diagram of an armrest according to the related art.
Figure 2:
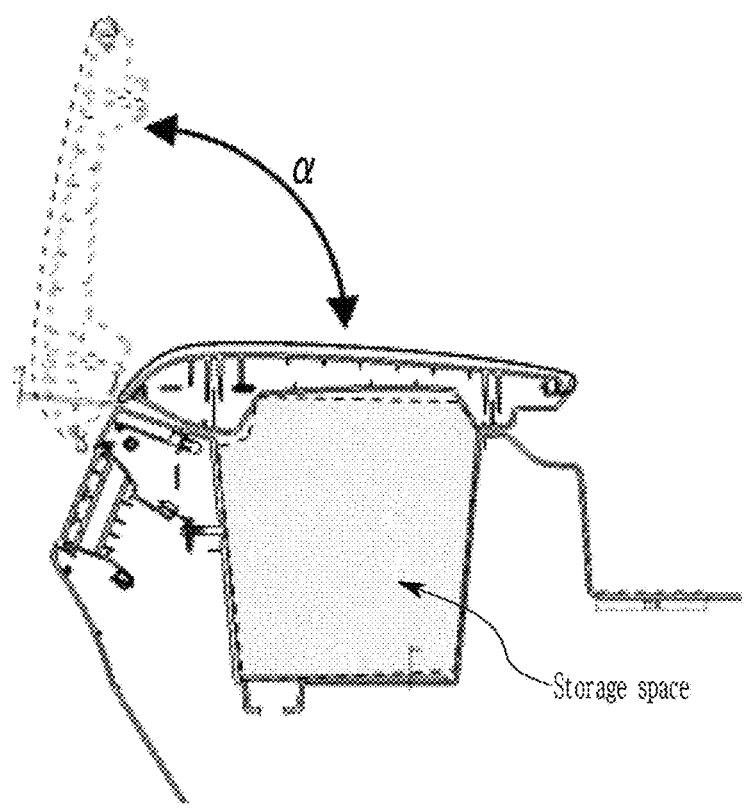
FIG. 2 is a schematic diagram of an armrest of a console assembly according to the related art, wherein the armrest may be opened or closed, and a lower storage space may be exposed in an open state indicated by a dotted line.

It is to be understood that the drawings are not necessarily drawn to scale, and various features are simplified to explain the basic principles of the present disclosure. The specific design features (including, for example, specific sizes, directions, positions, and shapes) disclosed in the present disclosure are determined in part by the specific application and intended use environment.

In these drawings, the same reference numbers throughout the drawings indicate identical or equivalent parts of the present disclosure.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Hereinafter, reference will be made in detail to various embodiments of the present disclosure, which will be described later by way of illustration in the drawings. While the present disclosure has been described in conjunction with exemplary embodiments, it is to be understood that this specification is not intended to limit the disclosure to these exemplary embodiments. To the contrary, the present disclosure is intended to cover these exemplary embodiments, as well as various alternatives, modifications, equivalents and other embodiments defined by the spirit of the present disclosure and the appended claims.

Hereinafter, a rotatable armrest according to an exemplary embodiment of the present disclosure will be described with reference to FIGS. 3 to 22.

A rotatable armrest according to an exemplary embodiment of the present disclosure may include a case A-1, A-4, A-5, and A-6, a knob system A-2, and a hinge system A-3, and the knob system A-2 and the hinge system A-3 are mounted in the case.

The hinge system A-3 includes a counterbalance shaft 16. The rotatable armrest may rotate about the counterbalance shaft 16 and may be fixed in a first position, a second position, or a third position. In the first position, the rotatable armrest is in a folded down state; in the second position, the rotatable armrest is in a horizontally forward-facing state; and in the third position, the rotatable armrest is in a horizontally backward-facing state.

Here, the forward-facing direction may mean a direction toward a front portion of the vehicle (i.e., a forward direction), and the backward-facing direction may mean a direction toward a rear portion of the vehicle (i.e., a direction opposite to the forward direction).

Figure 7:
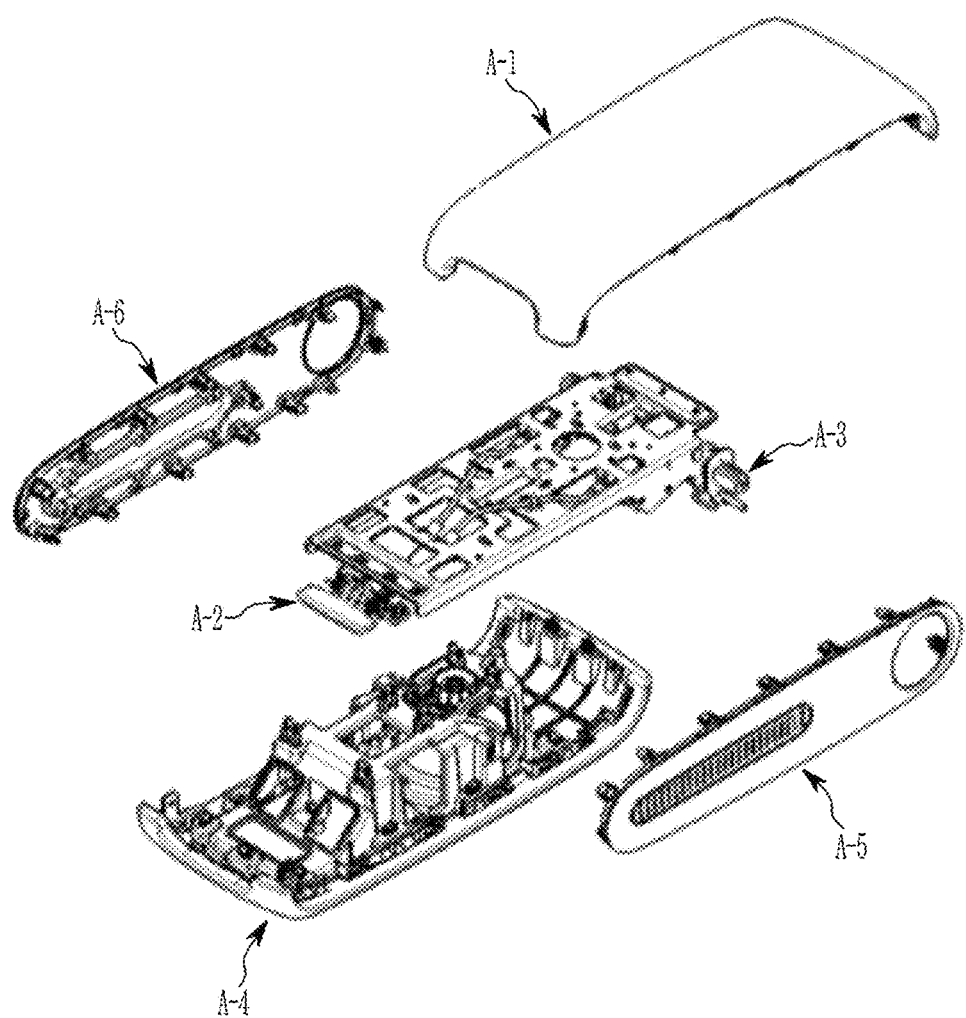
FIG. 7 is an exploded perspective view of a rotatable armrest according to an exemplary embodiment of the present disclosure.

As illustrated in FIG. 7, the rotatable armrest according to the exemplary embodiment of the present disclosure may include an armrest upper cover A-1, the knob system A-2, the hinge system A-3, an armrest lower cover A-4, a left garnish A-5, and a right garnish A-6. The armrest upper cover A-1, the armrest lower cover A-4, the left garnish A-5, and the right garnish A-6 are combined to form the case, thereby accommodating the knob system A-2 and the hinge system A-3.

Figure 8:
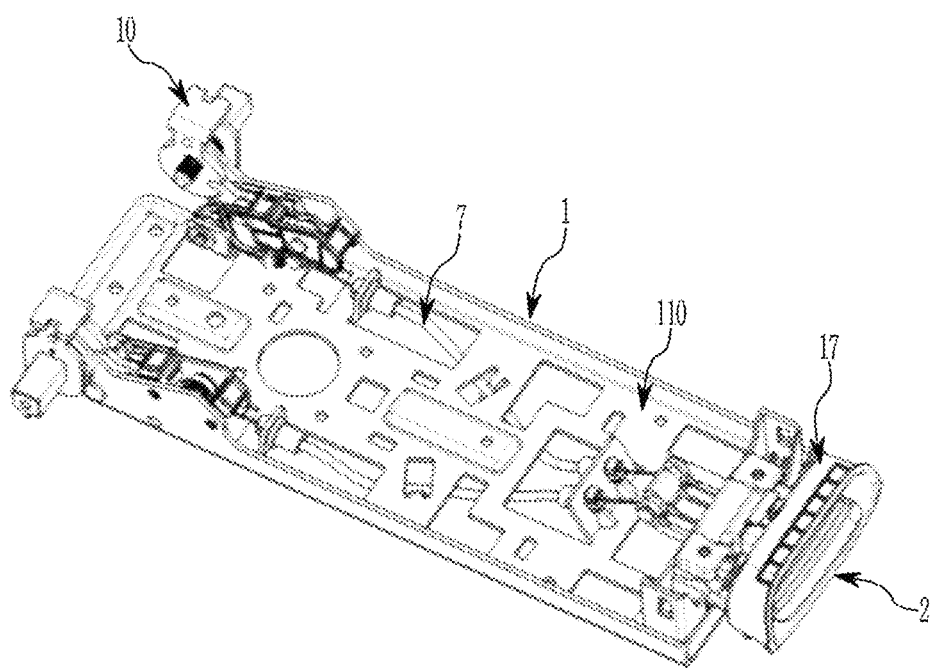
FIG. 8 is a schematic diagram illustrating that a knob system and a hinge system are assembled according to an exemplary embodiment of the present disclosure.
Figure 9:
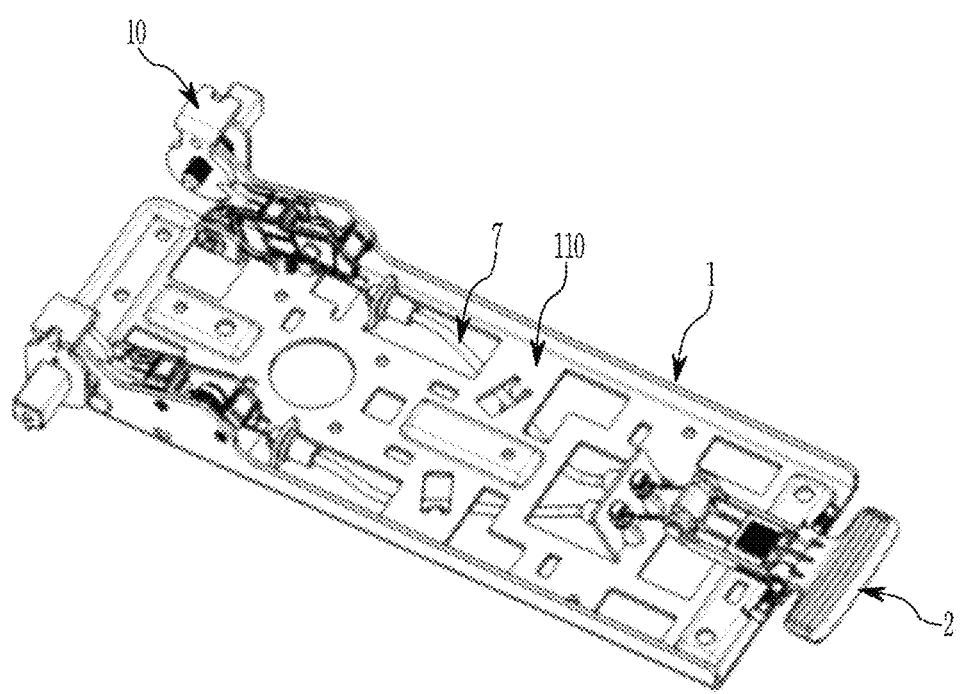
FIG. 9 is a schematic diagram illustrating a knob system and a hinge system in FIG. 8 from which a knob bracket is removed.
Figure 10:
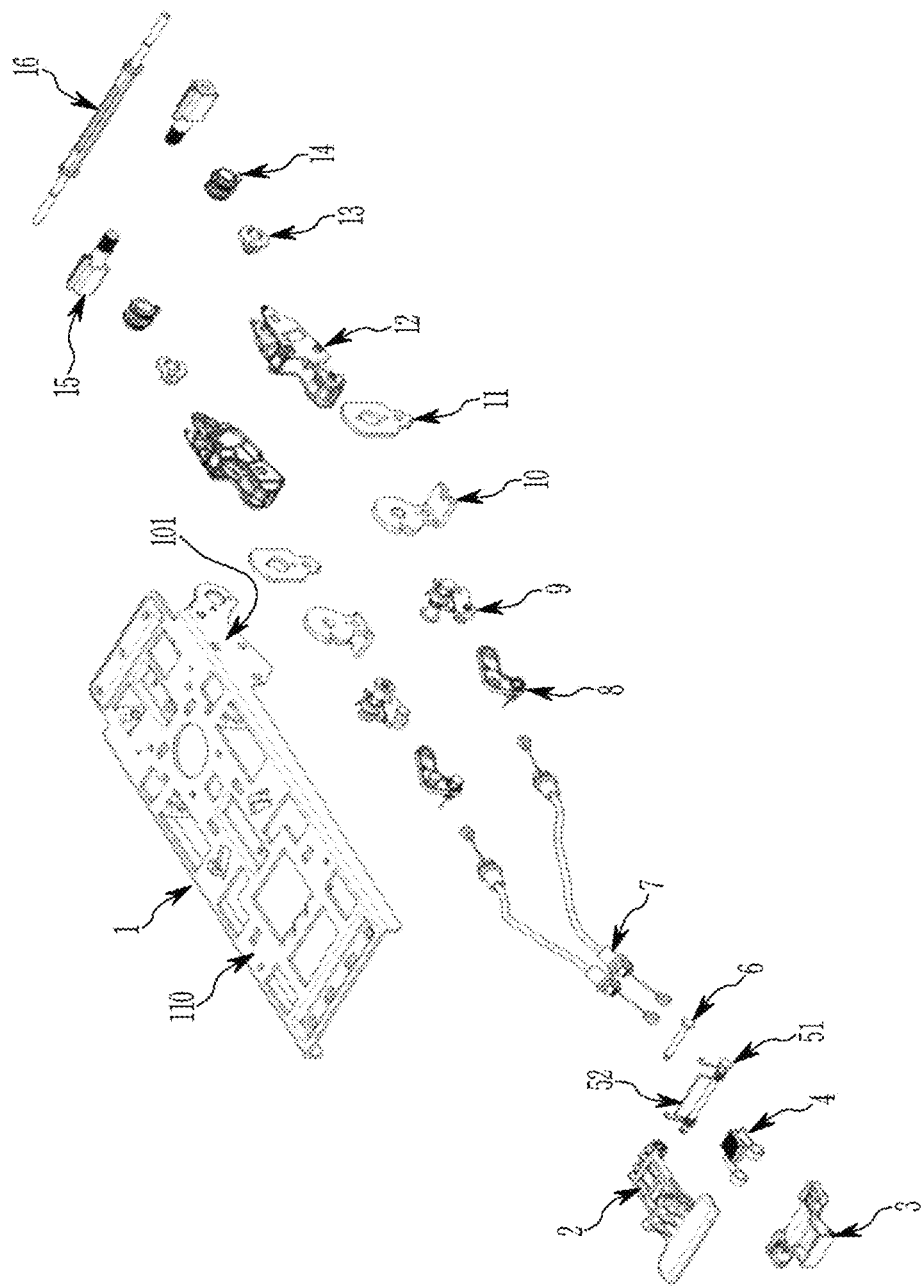
FIG. 10 is an exploded perspective view corresponding to FIG. 9.

As illustrated in FIGS. 8, 9, and 10, the knob system A-2 may include a knob bracket 17, a knob 2, a knob housing 3, a knob insert 4, a knob shaft 51, a torsion spring 52, and a knob rear shaft 6, and the knob 2, the knob housing 3, the knob insert 4, the knob shaft 51, the torsion spring 52, and the knob rear shaft 6 are mounted on the knob bracket 17.

The knob bracket 17 may be fixed to the hinge bracket 1 which will be described later.

The knob 2 may be positioned in an opening of a front end of the case formed by the armrest upper cover A-1, the armrest lower cover A-4, the left garnish A-5, and the left garnish A-6, and an operator may bend the knob 2 to proceed with the operation of the armrest.

A middle portion of the knob 2 may be mounted on the knob housing 3 through the knob shaft 51, and may rotate about the knob shaft 51. A rear end of the knob 2 is connected to one end of a wire 7, which will be described later, through the knob rear shaft 6. The knob shaft 51 sequentially passes through the knob insert 4 and the middle portion of the knob 2. The torsion spring 52 is fitted in the knob shaft 51, one end of the torsion spring 52 is connected to the knob bracket 17, and the torsion spring 52 applies a restoring force (opposite to a direction of the dotted line arrows X and Y in FIG. 11) for returning to the knob shaft 51.

The knob housing 3 may be mounted on the knob bracket 17.

The knob insert 4 may be fixed to the knob 2 and made of a rubber material to reduce noise.

Both ends of the knob rear shaft 6 may be connected to one ends of two wires 7, which will be described later, respectively, after passing through the knob 2.

Figure 11:
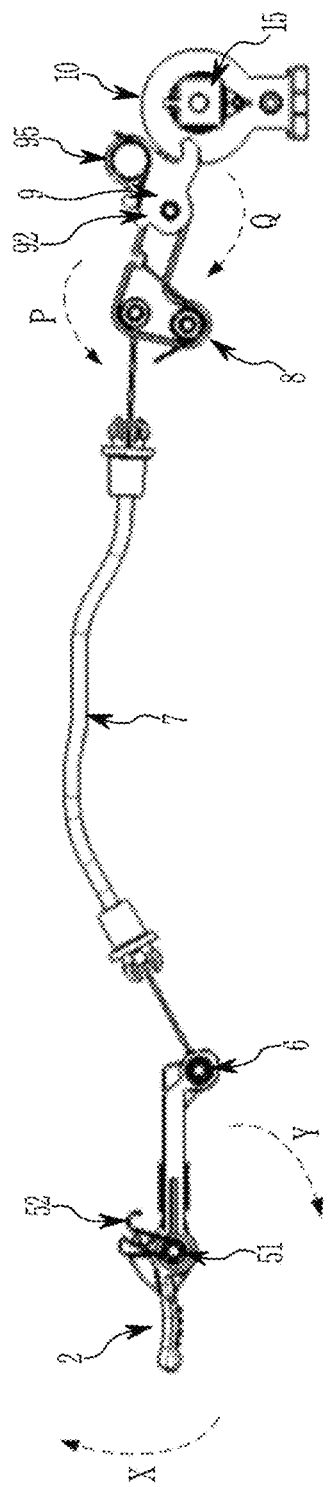
FIG. 11 is a side view of a knob system and a hinge system, wherein the knob bracket and hinge bracket are removed.

As illustrated in FIG. 11, when the front end of the knob 2 bends up (i.e., when the front end of the knob 2 rotates along the dotted line arrow X direction in FIG. 11), the knob 2 may rotate the rear end of the knob 2 downward (i.e., rotates the rear end of knob 2 along the dotted line arrow Y direction in FIG. 11) while rotating around the knob shaft 51 clockwise, and the rear end of the knob 2 may move the wire 7 forward by pulling the wire 7, which will be described later.

As illustrated in FIGS. 8, 9, 10, and 11, the hinge system A-3 may include the hinge bracket 1, the counterbalance shaft 16, two lock assemblies and two brake assemblies. Both the two lock assemblies and the two brake assemblies are symmetrically mounted on both left and right sides of the hinge bracket 1. That is, one locking assembly and one brake assembly are mounted on the left side of the hinge bracket 1, and the other locking assembly and the other brake assembly are mounted on the right side of the hinge bracket 1. In the course of use, both the locking assemblies and the brake assemblies rotate about the counterbalance shaft 16, thereby realizing the rotation of the armrest.

Although it has been described that two locking assemblies and two brake assemblies are used in this exemplary embodiment, only one locking assembly and one brake assembly may be installed. In this case, one locking assembly and one brake assembly may be selectively installed in a middle portion of the hinge bracket 1.

The hinge bracket 1 may include a hinge bracket body 110 and two mounting plates 101 located on both sides of a rear end of the hinge bracket body 110. The mounting plate 101 is provided with a plurality of mounting holes for mounting the locking assemblies and the brake assemblies.

The hinge bracket 1 may be mounted on the armrest upper cover A-1.

Each locking assembly may include the wire 7, a locking connection member 8, a locking member 9, and a housing 12. The housing 12 covers the locking connection member 8 and locking member 9, thereby protecting the locking connection member 8 and the locking member 9 to prevent foreign matter from affecting the operation of the locking assembly.

The wire 7 may be mounted on a middle portion of the hinge bracket body 110 of the hinge bracket 1, one end of the wire 7 may be connected to the knob rear shaft 6, and the other end of the wire 7 may be connected to a first end of the locking connection member 8.

The locking connection member 8 may be an L-shaped member and may have mounting holes located at the first end, a second end, and a middle portion. The first end of the locking connection member 8 is connected to the other end of the wire 7, the second end of the locking connection member 8 is connected to a connection part 92 of the locking member 9, the mounting hole of the locking connection member 8 is pivotably mounted on the mounting plate 101 of the hinge bracket 1 via a shaft 83, and the locking connection member 8 may rotate about the mount hole of the locking connection member 8. A torsion spring 81 is mounted on the shaft 83 connected to the mounting hole of the locking connection member 8 to provide a restoring force (opposite to a direction of a dotted line arrow P in FIG. 11) to the locking connection member 8. The torsion spring 81 is connected to the housing 12.

The locking member 9 may include a connection part 92, a protrusion 93, and a pivot part 95, and the connection part 92 of the locking member 9 may be connected to the second end of the locking connection member 8, the protrusion 93 of the locking member 9 may be selectively coupled with a concave groove 1001 on the lower bracket 10 mounted to the counterbalance shaft 16. A pivot part 95 of the locking member 9 is pivotably mounted on the mounting plate 101 of the hinge bracket 1 via a shaft 96, and the locking member 9 may rotate about the pivot part 95 of the locking member 9. A torsion spring 91 is mounted on the shaft 96 connected to the pivot part 95 of the locking member 9, and provides a restoring force (opposite to a direction of a dotted line arrow Q in FIG. 11) for returning to the locking member 9. The torsion spring 91 is connected to the housing 12.

Figure 13:
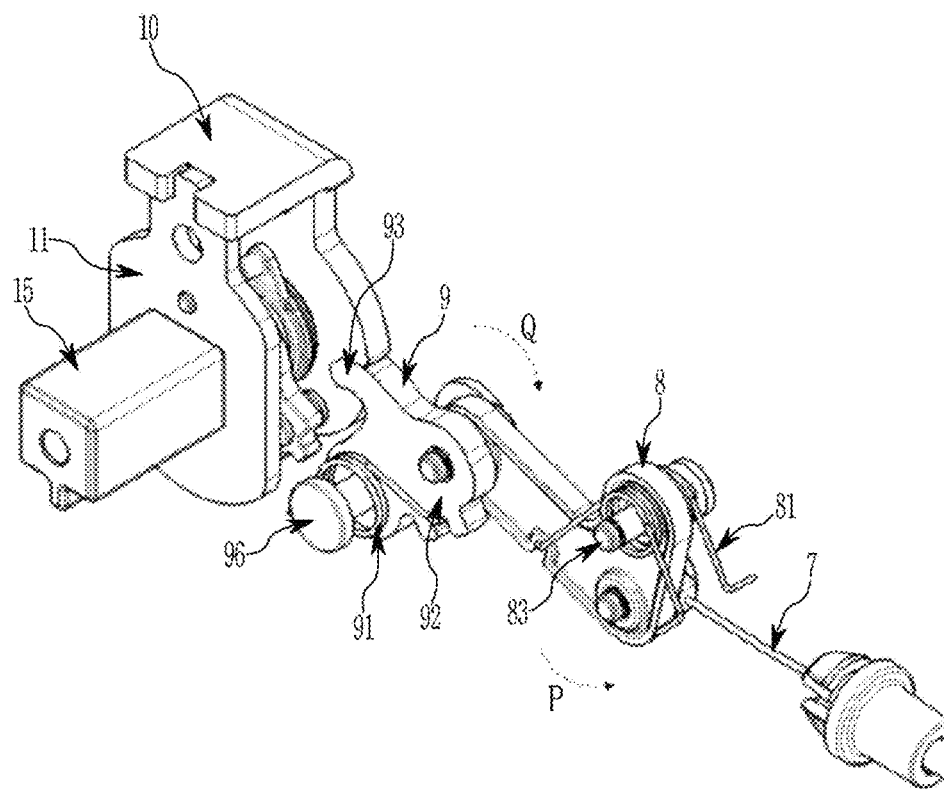
FIG. 13 is an anisometrical view of a locking assembly and a brake assembly.

As illustrated in FIGS. 11 and 13, when the wire 7 moves forward, the wire 7 may be allowed to rotate around the shaft 83 through which the locking connection member 8 passes through the mounting hole of the locking connection member 8 (the direction of rotation is the direction indicated by the dotted line arrow P in FIGS. 11 and 13). In this case, the second end of the locking connection member 8 allows the locking member 9 to rotate clockwise around the pivot part 95 of the locking member 9 (the direction of rotation is the direction indicated by the dotted line arrow Q in FIGS. 11 and 13), such that the protrusion 93 of the locking member 9 deviates from the concave groove 1001 of the lower bracket 10. Accordingly, the locking member 9 is unlocked.

Two lower brackets 10 may be installed on the counterbalance shaft 16, and each of the lower brackets 10 may be coupled with the protrusion 93 of one locking member 9. The lower bracket 10 includes a disc part 1005 and a lower bracket body 1006 formed integrally with each other. Both ends of the counterbalance shaft 16 are mounted on the lower bracket body 1006.

Although it has been described in this exemplary embodiment that the two lower brackets 10 are used, only one lower bracket 10 may be installed. In addition, one lower bracket 10 may optionally be installed in a middle portion of the counterbalance shaft 16, which corresponds to the case of one locking assembly and one brake assembly.

Figure 14:
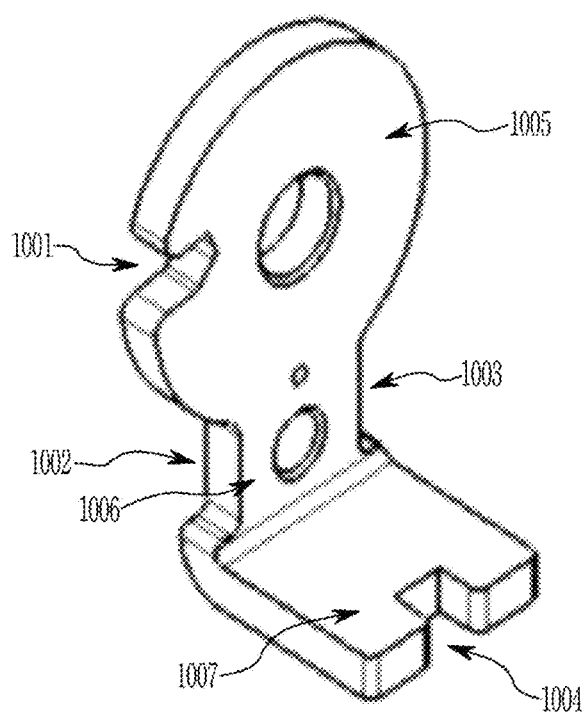
FIG. 14 is a structural schematic diagram of a lower bracket.
Figure 15:
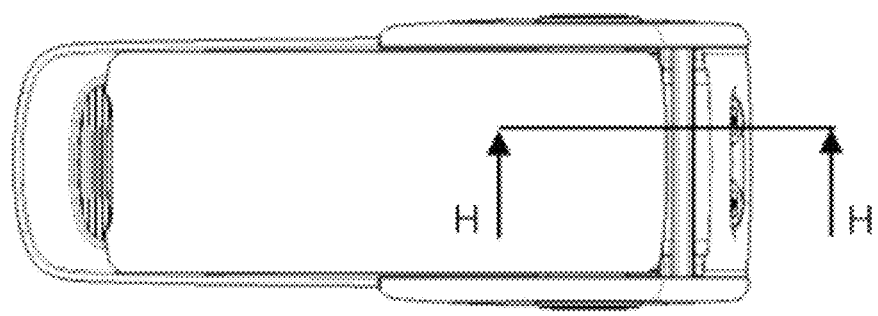
FIG. 15 is a plan view of a rotatable armrest located in a position for a front seat person according to an exemplary embodiment of the present disclosure.
Figure 16:
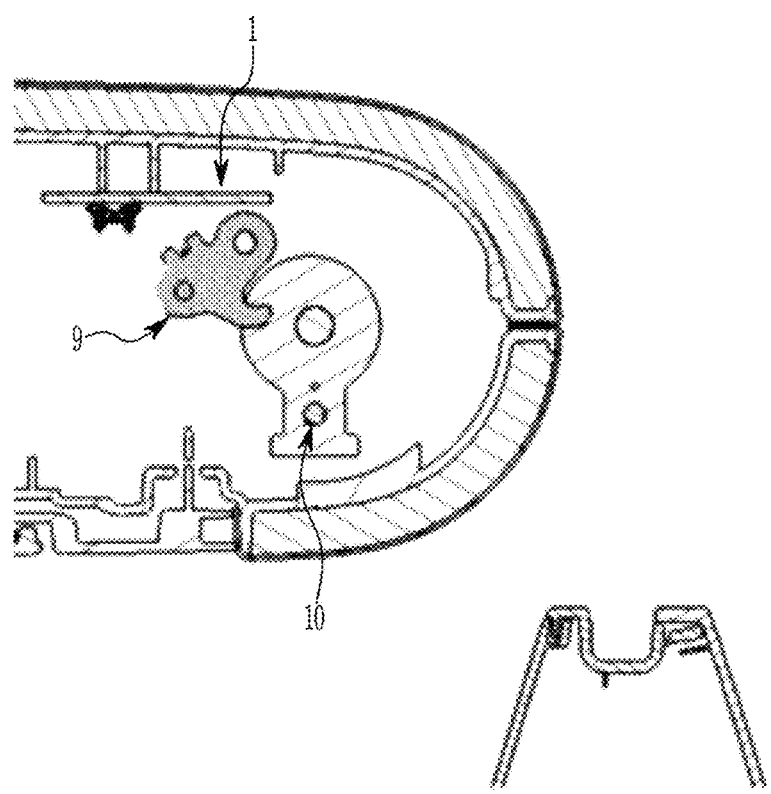
FIG. 16 is a cross-sectional view taken along a section line H-H in FIG. 15.
Figure 17:
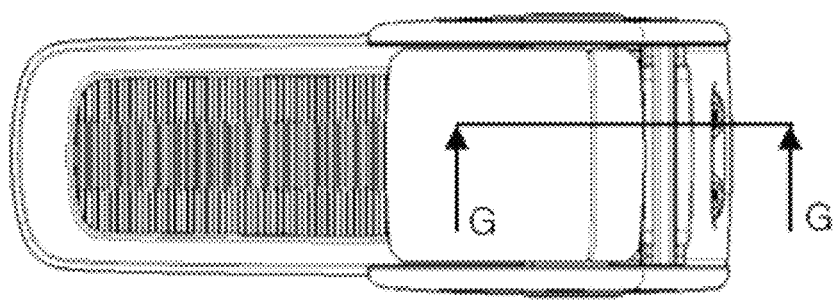
FIG. 17 is a plan view of a rotatable armrest located in a stored position according to an exemplary embodiment of the present disclosure.

As illustrated in FIG. 14, the concave groove 1001 corresponding to the protrusion 93 of the locking member 9 may be installed at a front end of an arc of the disk part 1005, and a mounting hole for mounting the brake assembly may be provided at a center of the disc part 1005.

As illustrated in FIG. 14, the mounting hole may be installed in the lower bracket body 1006, so the counterbalance shaft 16 passes through the mounting hole. A first latching groove 1002 and a second latching groove 1003 are installed at the front and rear ends of the lower bracket body 1006, respectively. Both ends of the arc of the disk part 1005 extend to the first latching groove 1002 and the second latching groove 1003, respectively, and the first latching groove 1002 and the second latching groove 1003 are to limit a rotation angle of the protrusion 93.

A bottom plate 1007 may be further installed on both sides of the lower bracket body 1006. A third latching groove 1004 is installed in the bottom plate 1007, and the third latching groove 1004 is for being caught in a shaft bracket 11 of the brake assembly, which will be described later.

The rotatable armrest may rotate about the counterbalance shaft 16 but the counterbalance shaft 16 and the lower bracket 10 do not move, and the armrest may be fixed in the first position, the second position, or the third position. In the first position, the rotatable armrest is in the folded down state (see FIGS. 17 and 18), and the protrusion 93 of the locking member 9 is caught in the first latching groove 1002. In the second position, the rotatable armrest is in the horizontally forward-facing state (see FIGS. 15 and 16), and the protrusion 93 of the locking member 9 is caught in the concave groove 1001 of the arc portion. In the third position, the rotatable armrest is in the horizontally backward-facing state (see FIGS. 19 and 20), and the pivot part 95 of the locking member 9 is caught in the second latching groove 1003.

Figure 12:
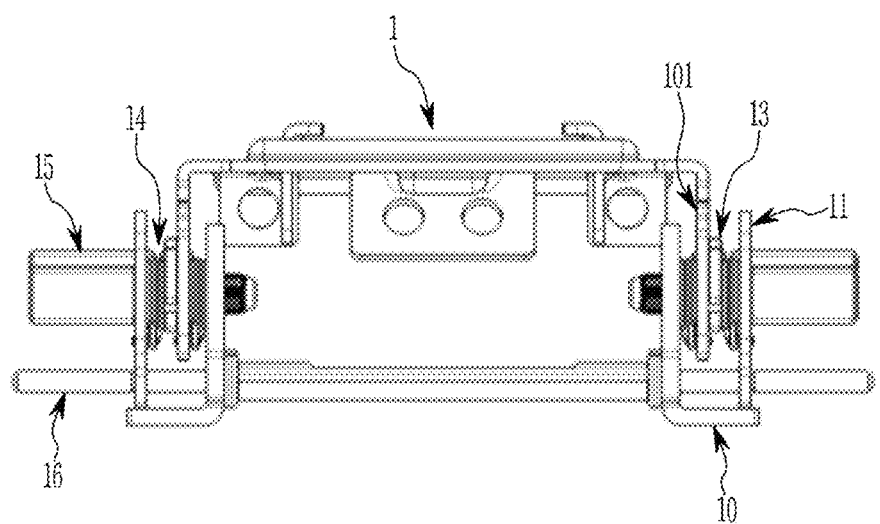
FIG. 12 is a rear view of a hinge system.

As illustrated in FIG. 12, each brake assembly may include a shaft bracket 11, a friction plate 13, a hinge washer 14, and a hinge shaft 15. The shaft bracket 11 is mounted on an outside of the lower bracket 10 through the hinge shaft 15, the friction plate 13 is mounted between the shaft bracket 11 and the mounting plate 101 of the hinge bracket 1 through the hinge shaft 15, and the hinge washer 14 is mounted between the friction plate 13 and the shaft bracket 11, and between the mounting plate 101 and the lower bracket 10, respectively.

A mounting hole through which the counterbalance shaft 16 penetrates and a mounting hole through which the hinge shaft 15 penetrates may be installed in the shaft bracket 11, and the counterbalance shaft 16 may penetrate through the shaft bracket 11 and the lower bracket 10. The lower end of the shaft bracket 11 is inserted and coupled into the third latching groove 1004 of the lower bracket 10, so the position of the shaft bracket 11 may be determined and fixed at the same time. The shaft bracket 11 serves to support the friction plate 13.

As illustrated in FIG. 12, the hinge shaft 15 may sequentially penetrate through the shaft bracket 11, the hinge washer 14, the friction plate 13, the mounting plate 101 of the hinge bracket 1, the hinge washer 14, and the lower bracket 10 from outside to inside, and then, is locked by a nut (not illustrated).

When the hinge bracket 1 rotates according to the rotation of the armrest, the friction plate 13 may provide a friction force, i.e., a braking force, thereby ensuring the armrest to be fixed in any position between the folded position and the use position of the rear seat.

Figure 4:
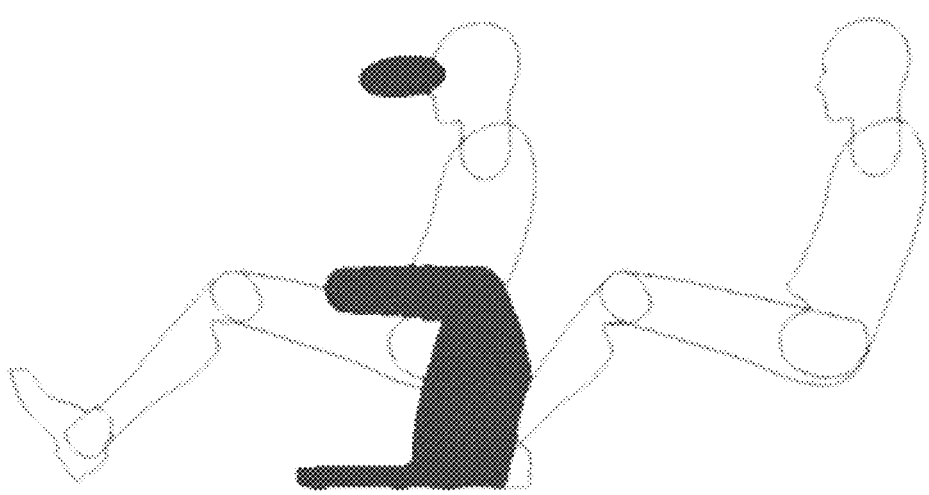
FIG. 4 is a schematic diagram of a use state of a rotatable armrest according to an exemplary embodiment of the present disclosure, wherein the rotatable armrest is allowed to be used by a front seat person.
Figure 5:
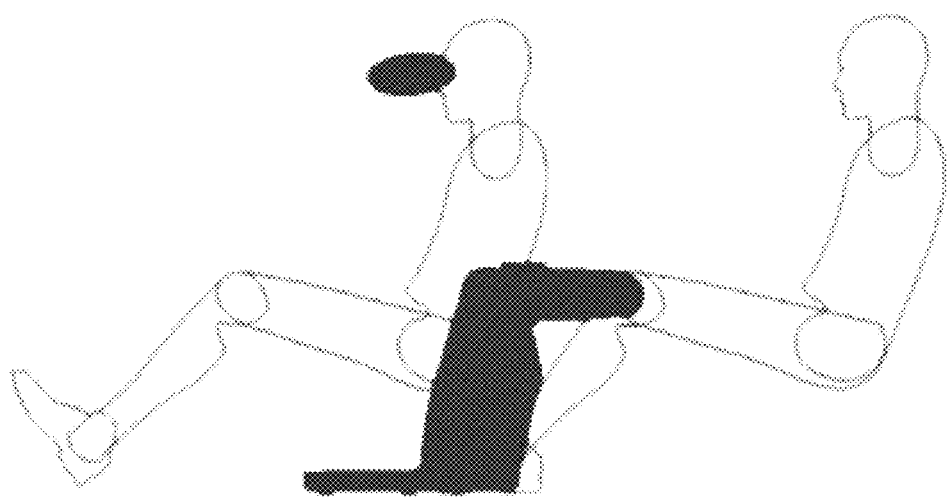
FIG. 5 is a schematic diagram of a use state of a rotatable armrest according to an exemplary embodiment of the present disclosure, wherein the rotatable armrest is allowed to be used by a rear seat person.

FIG. 4 is a schematic diagram of the use state of the rotatable armrest according to the exemplary embodiment of the present disclosure, wherein the rotatable armrest is allowed to be used by a front seat person. FIG. 5 is a schematic diagram of the use state of the rotatable armrest according to the exemplary embodiment of the present disclosure, wherein the rotatable armrest is allowed to be used by a rear seat person.

Figure 6:
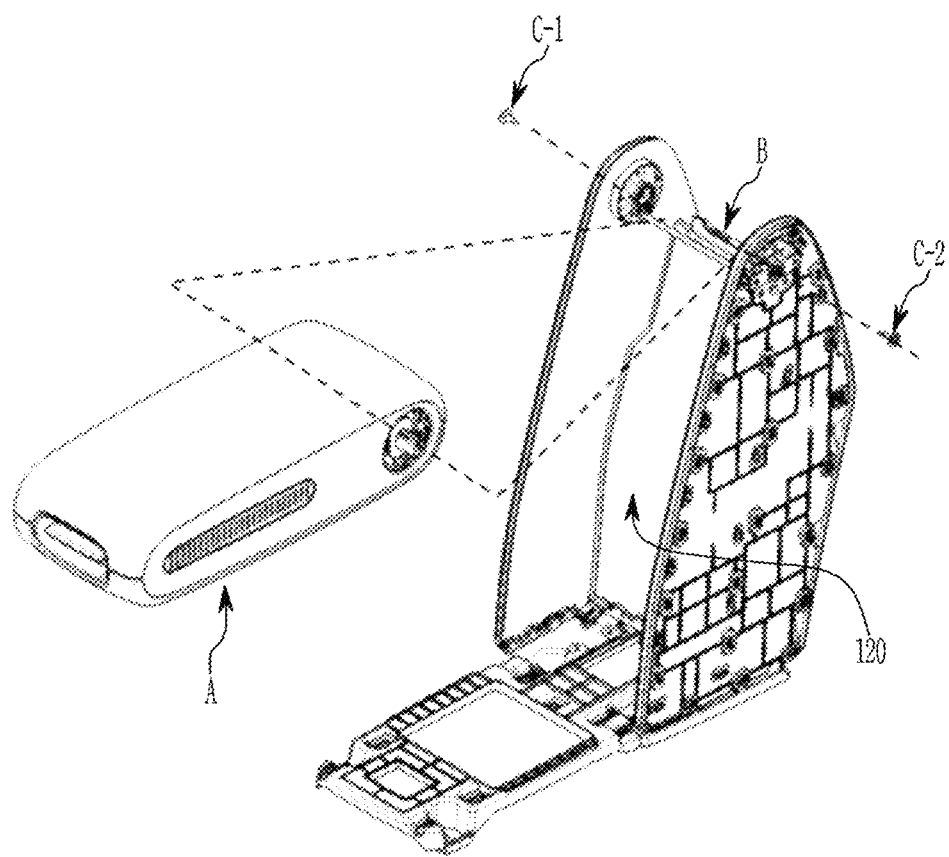
FIG. 6 is an exploded perspective view of a console assembly provided with a rotatable armrest according to an exemplary embodiment of the present disclosure.

FIG. 6 is an exploded perspective view of a console assembly provided with the rotatable armrest according to an exemplary embodiment of the present disclosure.

The console assembly may include the rotatable armrest A, a console B, and hinge mounting bolts C-1 and C-2.

Figure 21:
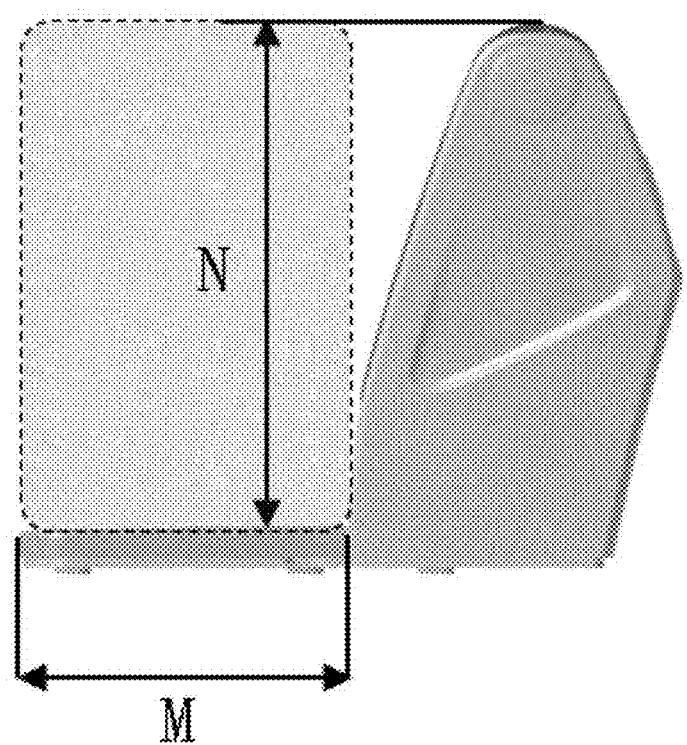
FIG. 21 is a schematic diagram of a usable space of a console assembly when a rotatable armrest is in a stored position according to an exemplary embodiment of the present disclosure.

The console B may include a concave groove 120 facing inward, and the rotatable armrest A may be disposed in the concave groove 120 when the rotatable armrest A is folded and stored, and thus, as illustrated in FIG. 21, the console assembly has a relatively large storage space.

The hinge mounting bolts may include a left hinge mounting bolt C-1 and a right hinge mounting bolt C-2, which penetrate through a hole on a side wall of the console B and are connected to the counterbalance shaft 16 behind the rotatable armrest A so that the counterbalance shaft 16 can be mounted on the side wall of the console B.

Referring to FIG. 12, when the rotatable armrest A is mounted on the console B (see FIG. 6), an end portion of the counterbalance shaft 16 may be inserted into the hole on the side wall of the console B, and mounted on the console B through the left/right hinge mounting bolts C-1 and C-2. When the rotatable armrest A rotates, the counterbalance shaft 16 does not move.

Figure 3:
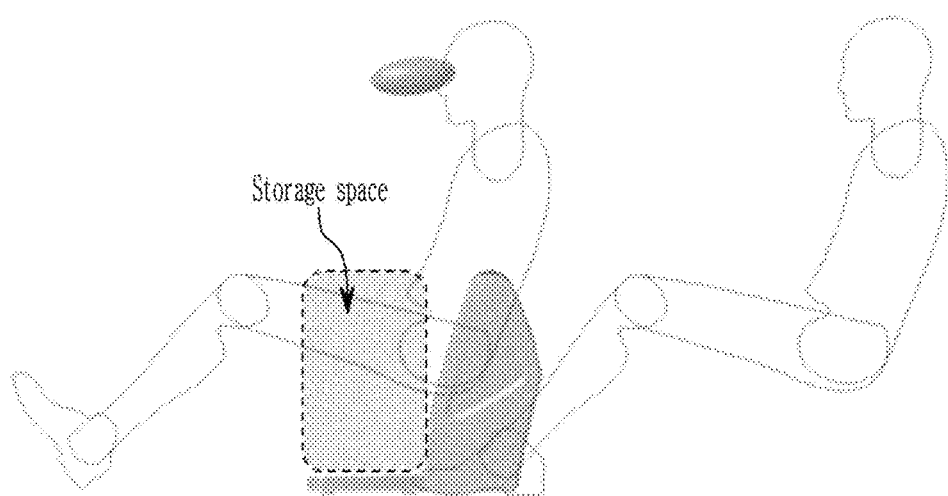
FIG. 3 is a schematic diagram of a use state of a rotatable armrest according to an exemplary embodiment of the present disclosure, wherein the rotatable armrest is in a stored state.

The rotatable armrest A according to the exemplary embodiment of the present disclosure may be folded, and as illustrated in FIG. 3, when the rotatable armrest A is folded into the console assembly, more storage space may be secured.

Figure 22:
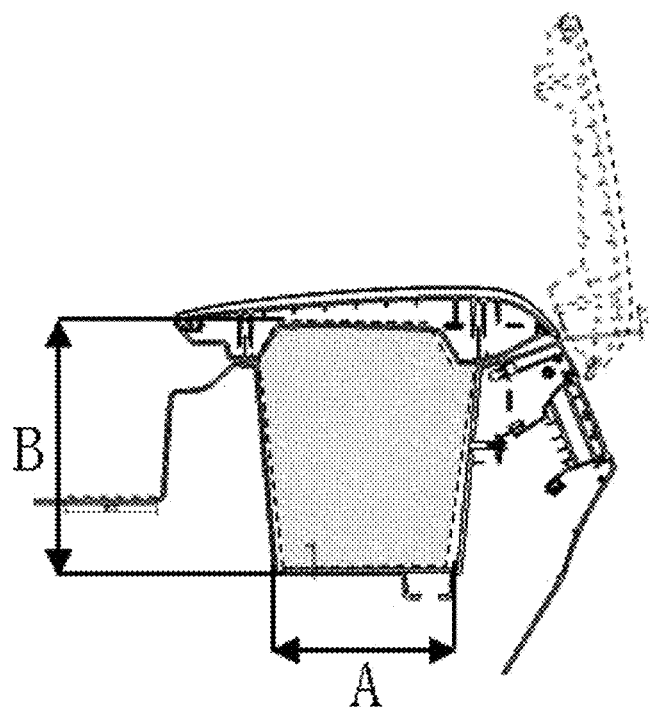
FIG. 22 is a schematic diagram of a usable space of a console assembly according to the related art.

Specifically, referring to FIG. 21, the storage space of the console assembly provided with the rotatable armrest A according to the exemplary embodiment of the present disclosure may have a height N of 473 mm, a width M of 270 mm, and a cross-sectional area of 270 mm×473 mm=127,710 mm². FIG. 22 illustrates a schematic diagram of a usable space of the console assembly according to the related art. The storage box of the related art has a height B of 196 mm, a width A of 128 mm, and a cross-sectional area of 128 mm×196 mm=25,088 mm². Accordingly, the cross-sectional area of the storage space of the console assembly according to the exemplary embodiment of the present disclosure is much larger than the that of the storage box of the related art.

The rotatable armrest of the console according to the exemplary embodiment of the present disclosure may rotate by 180° from a position that may be used by the front seat passenger, and thus, used by the rear seat passenger.

Consequently, the rotatable console device may make the use of the rear seat passengers easier and provide more storage space for the front seat passengers.

Hereinafter, an operation of the rotatable armrest according to the exemplary embodiment of the present disclosure will be described in detail with reference to the accompanying drawings.

When an operator rotates the front end of the knob 2 upward (i.e., rotates along the direction indicated by the dotted line arrow X of FIG. 11) and pulls the wire 7 to move forward, the wire 7 may pull and rotate the locking connection member 8 (i.e., rotates along the direction indicated by the dotted line arrow P in FIG. 11), and may pull and rotate the locking member 9 (i.e., rotates along the direction indicated by the dotted line arrow Q of FIG. 11), so the protrusion of the locking member 9 deviates from the concave groove 1001 of the arc portion on the lower bracket 10. Then, the armrest A may rotate counterclockwise or clockwise.

The rotatable armrest A may be in three positions. In the first position, the rotatable armrest A is stored in the concave groove 120 of the console B at an angle of −74° with respect to the horizontal line and is in the folded state. In the second position, the rotatable armrest A is at an angle of 0° with respect to the horizontal line and is in the position for the front seat person. In the third position, the rotatable armrest A is at an angle of 180° with respect to the horizontal line and is in the position for the rear seat person.

The operation of the rotatable armrest A may include three processes.

Figure 18:
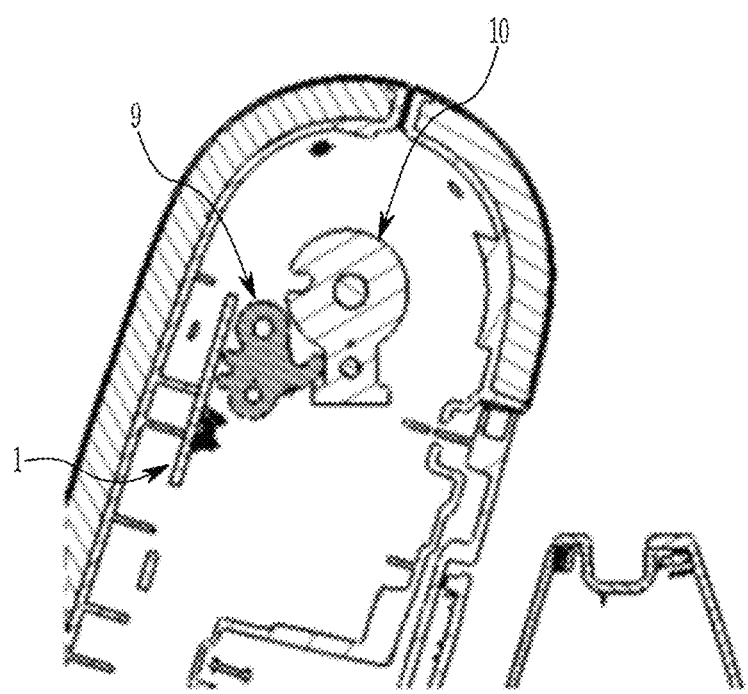
FIG. 18 is a cross-sectional view taken along a section line G-G in FIG. 17.
Figure 19:
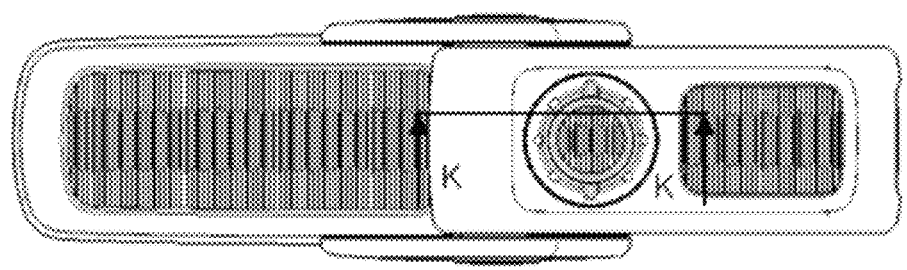
FIG. 19 is a plan view of a rotatable armrest located in a position for a rear seat person according to an exemplary embodiment of the present disclosure.

(1) from the Second Position to the First Position (0°→−74°):

By bending the knob 2, the armrest may be folded down (0°→−74°). The knob system A-2 may move the wire 7 to release the coupling between the locking member 9 and the concave groove 1001 of the lower bracket 10, thereby unlocking the locking member 9. Thereafter, the armrest A may rotate about the counterbalance shaft 16. Referring to FIG. 18, the first latching groove 1002 of the lower bracket 10 may limit the folding angle of the armrest A.

(2) From the First Position to the Third Position Through the Second Position (−74°→0°→180°):

That is, the armrest A rotates from the folded position to the position for the rear seat passenger. In this process, the protrusion 93 of the locking member 9 comes into contact with the arc of the lower bracket 10. When it is not necessary to rotate the armrest A beyond the second position, the armrest A may be rotated without the need to operate the knob 2.

Figure 20:
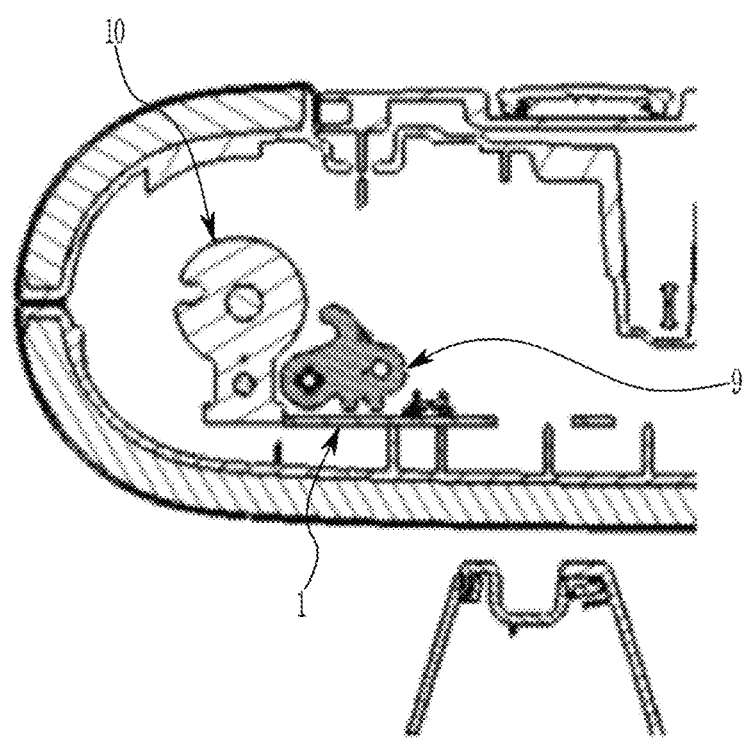
FIG. 20 is a cross-sectional view taken along a section line K-K in FIG. 19.

In the case where the armrest A is to rotate beyond the second position (0°), when the armrest A passes through the second position, the user may put the knob 2 in the bent up state, so the protrusion 93 of the locking member 9 is not locked into the concave groove 1001 of the lower bracket 10 again when the armrest A passes the second position (0°). In addition, the user may overcome the frictional force generated by the friction plate 13 and the mounting plate 101 and rotate the armrest A. Referring to FIG. 20, the armrest A may stop at any position, and the second latching groove 1003 of the lower bracket 10 limits an angle (180°) at which the armrest A rotates backward.

(3) from the Third Position to the Second Position (180°→0°):

That is, the armrest A may rotate from the position for the rear seat passenger to the position for the front seat passenger. The user may rotate the armrest A by overcoming the frictional force, and may stop the armrest A at any position.

When the armrest A moves to the second position (0°), if the knob 2 is not continuously bent, the torsion spring 52 may rotate the knob shaft 51 counterclockwise to return the knob 2. Further, the knob 2 no longer pulls the wire 7 to move forward, and by the action of the torsion spring 81 and the torsion spring 91, the locking connection member 8 and the locking member 9 return and the protrusion 93 of the locking member 9 is inserted into the concave groove 1001 of the lower bracket 10. Accordingly, when the knob 2 is not continuously bent, the armrest A rotates downward toward the second position, but does not pass the second position.

The rotatable armrest and the console assembly according to the exemplary embodiment of the present disclosure has been described by combining the drawings and specific exemplary embodiments above. However, in the exemplary embodiment of the present disclosure, only the case where the rotatable armrest is applied to a vehicle is shown, but the present disclosure may be applied to other cases such as trains, ships, and airplanes. In addition, the present disclosure is not limited to being installed on the armrest of mobile transportation means, and may be installed in other positions.

To facilitate and clearly define the interpretation of the appended claims, "upper portion," "lower portion," "inside," "outside," "on," "beneath," "above," "below," "upward," "downward," "before," "after," "back," "inner side," "outer side," "inward," "outward," "inside," "outside," "of inside," "of outside," "forward," "rearward" are used to describe features of exemplary embodiments with reference to the locations of these features shown in the drawings.

The description of the above exemplary embodiments is merely for describing the technical solution of the present disclosure, and is not intended to be exhaustive, nor is it intended to limit the present disclosure to the precise form described. It is apparent that those skilled in the art can make various modifications and changes according to the above teachings. Selectively describing exemplary embodiments may facilitate the understanding of others skilled in the art by interpreting specific principles of the present disclosure and practical applications thereof to implement and use various exemplary embodiments of the present disclosure and various selective forms and modifications of the present disclosure. The scope of protection of the present disclosure is defined by the appended claims and equivalent forms.

What is claimed is:

1. A rotatable armrest, comprising:
a case;
a knob system; and
a hinge system,
wherein the knob system and the hinge system are mounted in the case, and
wherein the hinge system comprises a counterbalance shaft having at least one lower bracket for supporting the armrest in a plurality of positions, and
wherein the rotatable armrest is rotatable about the counterbalance shaft and fixed in a first position, a second position, and a third position.

2. The rotatable armrest of claim 1, wherein
in the first position, the rotatable armrest is positioned in a folded down position,
in the second position, the rotatable armrest is positioned in a horizontally forward-facing position, and
in the third position, the rotatable armrest is positioned in a horizontally backward-facing position.

3. The rotatable armrest of claim 1, wherein the case comprises an armrest upper cover, an armrest lower cover, a left garnish and a right garnish that are coupled to each other, and
when the armrest upper cover, the armrest lower cover, the left garnish, and the right garnish are combined, an opening is formed in a front portion of the case.

4. The rotatable armrest of claim 3, wherein the knob system comprises a knob, and the knob is positioned within the opening.

5. The rotatable armrest of claim 4, wherein:
the knob system further comprises a knob housing, a knob shaft, a first torsion spring, a knob rear shaft, and a knob bracket.

6. The rotatable armrest of claim 5, wherein:
a rear end of the knob is connected to the knob rear shaft, a middle portion of the knob is mounted on the knob housing through the knob shaft, the knob is rotatable about the knob shaft, the knob shaft is fitted with a first torsion spring, one end of the first torsion spring is connected to the knob bracket, and the first torsion spring applies a restoring force for returning the knob shaft to the knob shaft, and
the knob housing is mounted on a knob bracket.

7. The rotatable armrest of claim 6, wherein:
the at least one lower bracket comprises a disc part and a lower bracket body.

8. The rotatable armrest of claim 7, wherein:
a concave groove is installed at a front end of an arc of the disc part, front and rear ends of the lower bracket body are each provided with first and second latching grooves, and both ends of the arc of the disc part extend to the first latching groove and the second locking groove, respectively.

9. The rotatable armrest of claim 8, wherein:
the hinge system further comprises a hinge bracket, a locking assembly, and a brake assembly,
the number of locking assemblies and brake assemblies corresponds to the number of lower brackets, and
the locking assembly and the brake assembly are mounted on the hinge bracket.

10. The rotatable armrest of claim 9, wherein:
the hinge bracket comprises a hinge bracket body and a mounting plate positioned at a rear end of the hinge bracket body.

11. The rotatable armrest of claim 10, wherein:
the locking assembly comprises a wire, a locking connection member, and a locking member.

12. The rotatable armrest of claim 11, wherein:
the wire is mounted on a middle portion of the hinge bracket body of the hinge bracket, one end of the wire is connected to the knob rear shaft, the locking connection member and the locking member are each rotatably mounted on the mounting plate of the hinge bracket through the first and second shafts, a first end of the locking connection member is connected to the other end of the wire, and a second end of the locking connection member is connected to a connection part of the locking member.

13. The rotatable armrest of claim 12, wherein:
second and third torsion springs are provided on the first and second shafts, respectively, and the second and third torsion springs provide the restoring force for returning the locking connection member and the locking member to the locking connection member and the locking member, respectively.

14. The rotatable armrest of claim 13, wherein:
the locking assembly further comprises a housing, and the housing covers the locking connection member and the locking member.

15. The rotatable armrest of claim 9, wherein:
the brake assembly comprises a shaft bracket, a friction plate, and a hinge shaft.

16. The rotatable armrest of claim 15, wherein:
the shaft bracket is mounted on an outside of the lower bracket through the hinge shaft, and the friction plate is mounted between the shaft bracket and the mounting plate of the hinge bracket through the hinge shaft.

17. A console assembly, comprising:
a console;
the rotatable armrest of claim 1; and
a connection device for mounting the rotatable armrest on the console.

18. The console assembly of claim 17, wherein:
the connection device comprises a hinge mounting bolt, and the armrest assembly is mounted on the console through the hinge mounting bolt.

19. A vehicle comprising the rotatable armrest of claim 11.

20. A vehicle comprising the console assembly of claim 17.

* * * * *